(12) United States Patent
Dantlgraber (10) Patent No.: US 7,112,057 B2
(45) Date of Patent: Sep. 26, 2006

(54) INJECTION UNIT FOR A PLASTIC INJECTION MOULDING MACHINE

(75) Inventor: Jörg Dantlgraber, Lohr am Main (DE)

(73) Assignee: Bosch Rexroth AG, Lohr/Main (DE)

( * ) Notice: Subject to any disclaimer, the term of this patent is extended or adjusted under 35 U.S.C. 154(b) by 217 days.

(21) Appl. No.: 10/276,761

(22) PCT Filed: Apr. 28, 2001

(86) PCT No.: PCT/EP01/04805

§ 371 (c)(1), (2), (4) Date: Apr. 28, 2003

(87) PCT Pub. No.: WO01/89799

PCT Pub. Date: Nov. 29, 2001

(65) Prior Publication Data

US 2003/0165590 A1   Sep. 4, 2003

(30) Foreign Application Priority Data

May 23, 2000 (DE) .................................. 100 25 542
Oct. 25, 2000 (DE) .................................. 100 52 761

(51) Int. Cl.
  *B29C 45/48* (2006.01)
(52) U.S. Cl. ........................................ 425/574; 425/587
(58) Field of Classification Search ................ 425/574, 425/587
See application file for complete search history.

(56) References Cited

U.S. PATENT DOCUMENTS 4,755,123 A * 7/1988 Otake .......................... 425/145
5,482,452 A * 1/1996 Hehl ........................... 425/145
5,585,126 A * 12/1996 Heindl, deceased et al. ............................ 425/589

(Continued)

FOREIGN PATENT DOCUMENTS

DE      4344335      6/1995
DE     19605747      8/1997

OTHER PUBLICATIONS

Patent Abstracts of Japan, vol. 9, No. 294 (M-431) Nov. 20, 1985 & JP 60 132723 A (Fanuc KK), Jul. 15, 1985.

*Primary Examiner*—Joseph S. Del Sole
*Assistant Examiner*—Emmanuel S. Luk
(74) *Attorney, Agent, or Firm*—Martin A. Farber (57) ABSTRACT

An injection unit for a plastic injection molding machine having a screw, having a motion spindle as first drive element, via which the screw can be rotationally driven for the plasticization and is movable in the axial direction for the injection, having a spindle nut as second drive element, which is coupled to the motion spindle via a motion screw thread, having a large electric motor which is arranged so as to be fixed to the frame and by which, while one drive element is held against rotation, the other drive element can be rotationally driven for moving the screw during the injection, and having a device which is arranged so as to be fixed to the frame and by which a rotational speed of the one drive element can be preset during the plasticization, this rotational speed being different from the rotational speed at which the large electric motor simultaneously drives the other drive element. In a known injection unit of this type, two equally large electric motors, which can both apply a large torque, are used, by which such a counter-torque is exerted on the motion spindle during the injection operation that the motion spindle does not rotate. On the whole, the known injection unit is quite expensive on account of the two electric motors designed for a high torque. In order to provide a more cost-effective injection unit, the drive element held against rotation during the moving of the screw for the injection can be locked by a releasable mechanical brake.

20 Claims, 6 Drawing Sheets

U.S. PATENT DOCUMENTS

| | | | |
|---|---|---|---|
| 5,645,868 A | * | 7/1997 | Reinhart ...................... 425/145 |
| 5,891,485 A | * | 4/1999 | Emoto ......................... 425/145 |
| 6,394,780 B1 | * | 5/2002 | Hehl ........................... 425/145 |
| 6,517,336 B1 | * | 2/2003 | Emoto et al. ................ 425/145 |
| 6,533,572 B1 | * | 3/2003 | Koide ......................... 425/587 |
| 2002/0168445 A1 | * | 11/2002 | Emoto et al. ................ 425/558 |

* cited by examiner

INJECTION UNIT FOR A PLASTIC INJECTION MOULDING MACHINE

FIELD AND BACKGROUND OF THE INVENTION

The invention is based on an injection unit for a plastic injection molding machine.

Such an injection unit has been disclosed by DE 43 44 335 C2. There, two equally large electric motors which are formed as hollow-shaft motors are arranged one behind the other in alignment with the axis of the screw. The screw is firmly connected to a motion spindle which is guided in a spindle nut. The screw joint between the motion spindle and the spindle nut contains balls as rolling bodies. The spindle nut forms the hollow shaft of the one electric motor, which, as viewed from the screw, is located in front of the other electric motor. The hollow shaft of this other electric motor, with a splined journal which lies in the axis of the motion spindle, engages in a spline recess of the motion spindle, so that splined journal and motion spindle are connected to one another in a rotationally locked manner, but the motion spindle can be displaced axially relative to the splined journal.

Essentially two different motion states of the screw can be distinguished from one another during operation. During the plasticization, the rear electric motor drives the screw at a certain rotational speed via the motion spindle and the splined journal. The front electric motor rotates the spindle nut at a rotational speed which differs by a small amount from the rotational speed of the rear electric motor. For example, the front electric motor can rotate slightly slower than the rear electric motor. The difference in rotational speed determines the speed at which the screw travels back. In the process, the difference in rotational speed is controlled in such a way that a certain dynamic pressure is built up and maintained in the screw antechamber into which the plasticized plastic material is delivered. To inject the plastic material, the screw has to be moved forward. To this end, the front electric motor continues to rotate the spindle nut, while the rear electric motor is energized in such a way that it prevents the motion spindle from rotating via the splined journal.

In the known injection unit, two equally large special electric motors which are relatively expensive are used for the drive of the screw.

SUMMARY OF THE INVENTION

The object of the invention is therefore to develop an injection unit of the above-mentioned type in such a way that it can be produced more cost-effectively.

This object is achieved in that, in an injection unit having the features of the preamble of patent claim 1, according to the characterizing part of this patent claim, the drive element held against rotation during the moving of the screw for the injection can be locked by a releasable mechanical brake. According to the invention, during the injection of plastic into the mold, which takes place under high pressure, not one of the electric motors is therefore used in order to lock the drive element to be secured against rotation, which has to take place against a relatively high torque on account of the high injection pressure and therefore also necessitates a relatively large electric motor. In addition, the counter-torque applied by the electric motor must correspond to the torque acting on the drive element, a factor which necessitates complicated control for the angular position of the drive element. In an injection unit according to the invention, on the other hand, the drive element is locked by a brake in a simple manner. No special control is necessary for this purpose. Only one large electric motor is used.

Advantageous configurations of an injection unit according to the invention can be gathered from the subclaims.

According to a feature of the invention, the braking force of the brake is variable, and the brake is at the same time the device by which the rotational speed of the one drive element can be preset during the plasticization. According to another feature of the invention, however, a second electric motor may also be used as such a device. This second electric motor may be relatively small and be of a conventional type of construction, so that the injection unit is still cost-effective even taking into account the costs for the brake.

It is also favorable in an injection unit according to the invention for the large electric motor, by which a drive element can be rotationally driven during the injection operation for moving the screw, to be arranged with its axis in alignment with the axis of the motion spindle and to be formed as a hollow-shaft motor which drives the drive element directly without a drive mechanism connected in between.

According to another feature of the invention, a second electric motor is advantageously arranged outside the axis of the motion spindle and is connected to the motion spindle or the spindle nut via driving means. The latter are preferably part of a speed reducer.

In an especially preferred development, the rotational speed of the spindle nut can be preset by the device. If a second electric motor is provided for this purpose, it thus rotates in a driving or braking manner only while the plastic material is being plasticized. To be precise, it rotates the spindle nut at a rotational speed which deviates slightly from the rotational speed at which the first electric motor drives the motion spindle. The difference in rotational speed determines the speed at which the screw moves back together with the motion spindle. In this case, the construction of the injection unit is especially simple if the large electric motor is connected to the motion spindle via a sliding pair, and the spindle nut can be locked against rotation by the brake. The large electric motor drives the motion spindle for the plasticization when the brake is released and when the spindle nut is driven by the second electric motor and for the injection of plastic when the spindle nut is locked by the brake. In principle, it is conceivable for the motion spindle and the screw to be firmly connected to one another, so that the screw also rotates during the injection of the plastic. However, it then appears to be difficult to accurately maintain the preset quantity of the plastic to be injected into the mold. Provision is therefore made according to still another feature of the invention for it to be possible for a rotational movement of the motion spindle to be transmitted to the screw via a clutch. During the injection, the clutch is released, so that the screw does not rotate despite a rotating motion spindle.

According to still another feature of the invention, the spindle nut can be rotationally driven by the large electric motor, and the motion spindle can be locked against rotation by the brake. In this configuration, it is possible to connect the motion spindle and the screw to form a fixed robust unit without the screw being rotated during the injection operation. This is because, during this injection operation, the motion spindle and thus the screw can be locked against rotation by the brake.

In this case, it is advantageous if the large electric motor is coupled to the motion spindle via a first clutch for rotating the screw during the plasticization and to the spindle nut via a second clutch for the injection of plastic. The large electric motor, as in the configuration according thereto, is thus used both to rotate the screw during the plasticization and to displace the screw forward during the injection of plastic into the mold.

The number of requisite components is kept small by a configuration according to the invention.

A clutch which is present may be an externally operated clutch or a one-way clutch, a "freewheel". If there are a plurality of clutches as in a configuration according to the invention, it is also possible to use one externally operated and one one-way clutch.

Also in another configuration according to the invention, the screw and the motion spindle may be firmly connected to one another. The second electric motor is coupled to the motion spindle via a sliding pair, a drive element lying in the kinematic chain between the second electric motor and the sliding pair, which drive element can be locked against rotation by the brake. In order to plasticize plastic, the second electric motor drives the motion spindle when the brake is released and when the spindle nut is driven by the first electric motor. For the injection of plastic, the first electric motor rotates the spindle nut when the motion spindle is locked against rotation by the brake, so that the motion spindle moves forward together with the screw. Such a powerful second electric motor has to be used here that it can apply the torque required for rotating the screw during the plasticization.

Several exemplary embodiments of an injection unit according to the invention can be seen from the drawings.

The invention will now be explained in more detail with reference to the figures of these drawings, in which.

Figure 1:
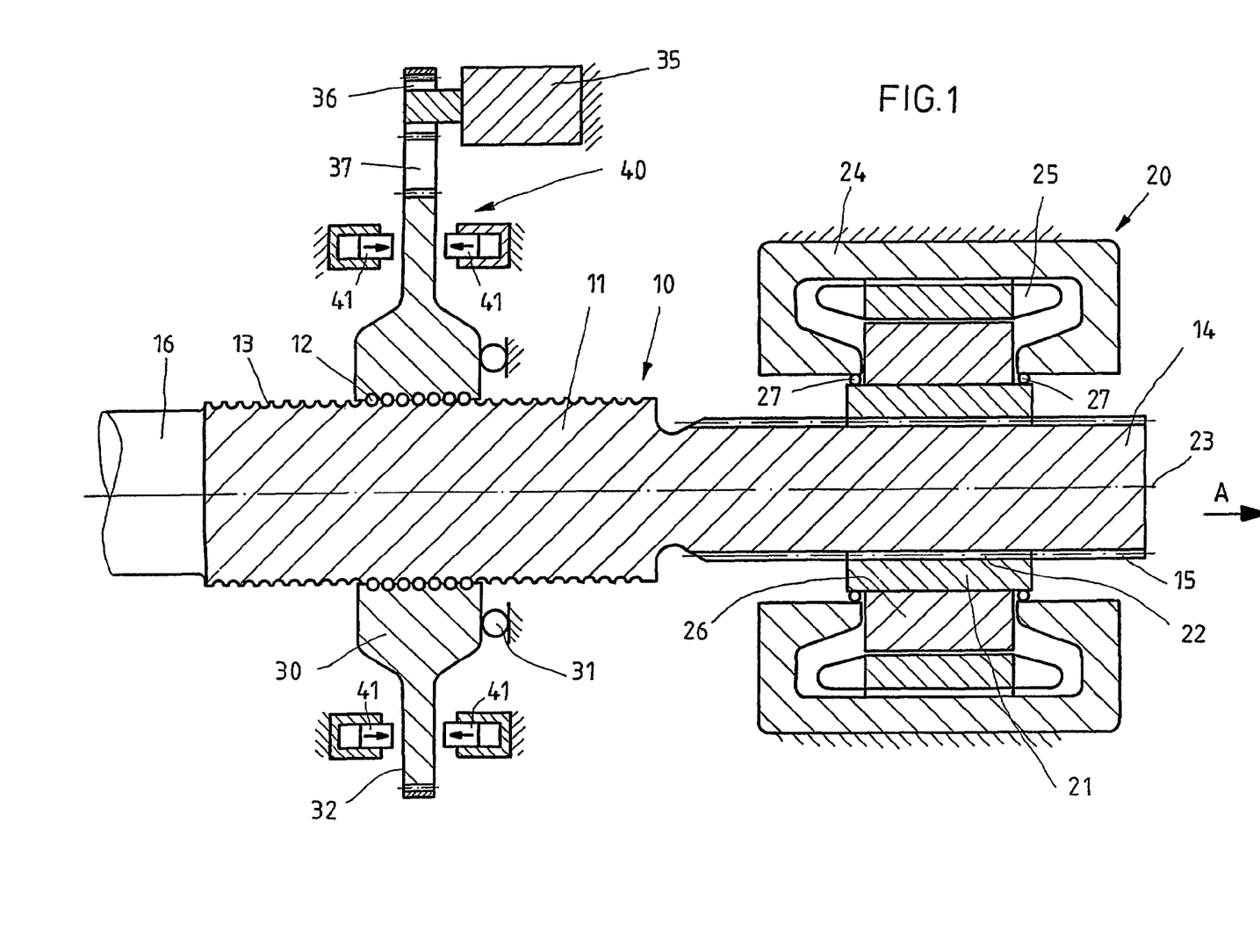
FIG. 1 shows the first exemplary embodiment, in which a large electric motor is directly coupled to the motion spindle via a sliding pair, a second electric motor drives the spindle nut via a belt, and the spindle nut can be locked by a brake.

According to FIG. 1, a motion spindle 10 of the injection unit, a detail of which is shown, has a section 11 with an external thread 13 suitable for guiding balls 12 and a section 14 which is formed as a splined shaft and is provided with axially running keyways 15. At one end of the threaded section 11, the motion spindle is firmly connected to a screw 16. The motion spindle 10 can be rotationally driven by a first electric motor 20. The latter is formed as a hollow-shaft motor with a hollow shaft 21 which has splines 22 on the inside, these splines 22 engaging in the keyways 15 of the motion spindle 10. A sliding pair is formed between the electric motor and the motion spindle 10 by the keyways 15 in the section 14 of the motion spindle 10 and by the splines 22 in the hollow shaft 21, this sliding pair permitting a rectilinear movement between the motion spindle 10 and the hollow shaft 21 in the direction of the axis 23 of the motion spindle. A housing 24 of the electric motor 20 accommodates a stator with windings 25 and is arranged so as to be fixed relative to the frame. The hollow shaft 21, which carries the rotor 26, is mounted in a rotatable manner in the housing 24 via two rolling-contact bearings 27 which can absorb both radial and axial forces. The electric motor 20 is a relatively powerful motor which can apply high torques.

Guided on the threaded section 11 of the motion spindle 10 is a spindle nut 30 which is formed as a recirculating ball sleeve and is axially supported via a thrust bearing 31 on its side facing the electric motor 20. In its center, the spindle nut 30 is provided with a disc-shaped flange 32, the outer periphery of which is toothed. A relatively small, second electric motor 35 having a drive pinion 36 is arranged so as to be fixed relative to the frame at a distance from the motion spindle 10 in such a way that the pinion 36 lies in the plane of the flange 32. The pinion 36 and flange 32 are connected to one another via a toothed belt 37.

The flange 32, as a type of brake disk, is also an integral part of a brake 40 which has brake shoes 41 on both sides of the flange, these brake shoes 41 being movable perpendicularly to the plane of the brake disk 32 but being arranged so as to be fixed relative to the frame parallel to this plane. With the brake 40, which can be actuated electromagnetically for example, the spindle nut 30 can be locked against rotation.

During operation, in order to plasticize plastic, the motion spindle 10 together with the screw 16 is driven by the first electric motor 20. The second electric motor 35 rotates the spindle nut 30 at a rotational speed which is slightly greater than the rotational speed of the motion spindle 10, in the same direction in which the motion spindle also rotates. On account of the difference in rotational speed, the motion spindle 10 travels back with the screw 16 in the direction of the arrow A depicted in FIG. 1. In this case, the rotational-speed difference and thus the return speed are selected in such a way that a certain dynamic pressure builds up in the plasticized plastic in front of the screw. The axial force exerted on the spindle nut 30 as a result is absorbed by the bearing 31.

If sufficient plastic is plasticized, the brake 40 is applied and locks the spindle nut 30 against further rotation. The electric motor 35 can be switched off. The electric motor 20 continues to rotate the motion spindle 10 as before in the same direction at a rotational speed required for the injection operation, so that, on account of the screw joint between the motion spindle 10 and the spindle nut 30, the motion spindle 10 and the screw 16 are now displaced against the direction of the arrow A and plastic is injected into the mold.

Figure 2:
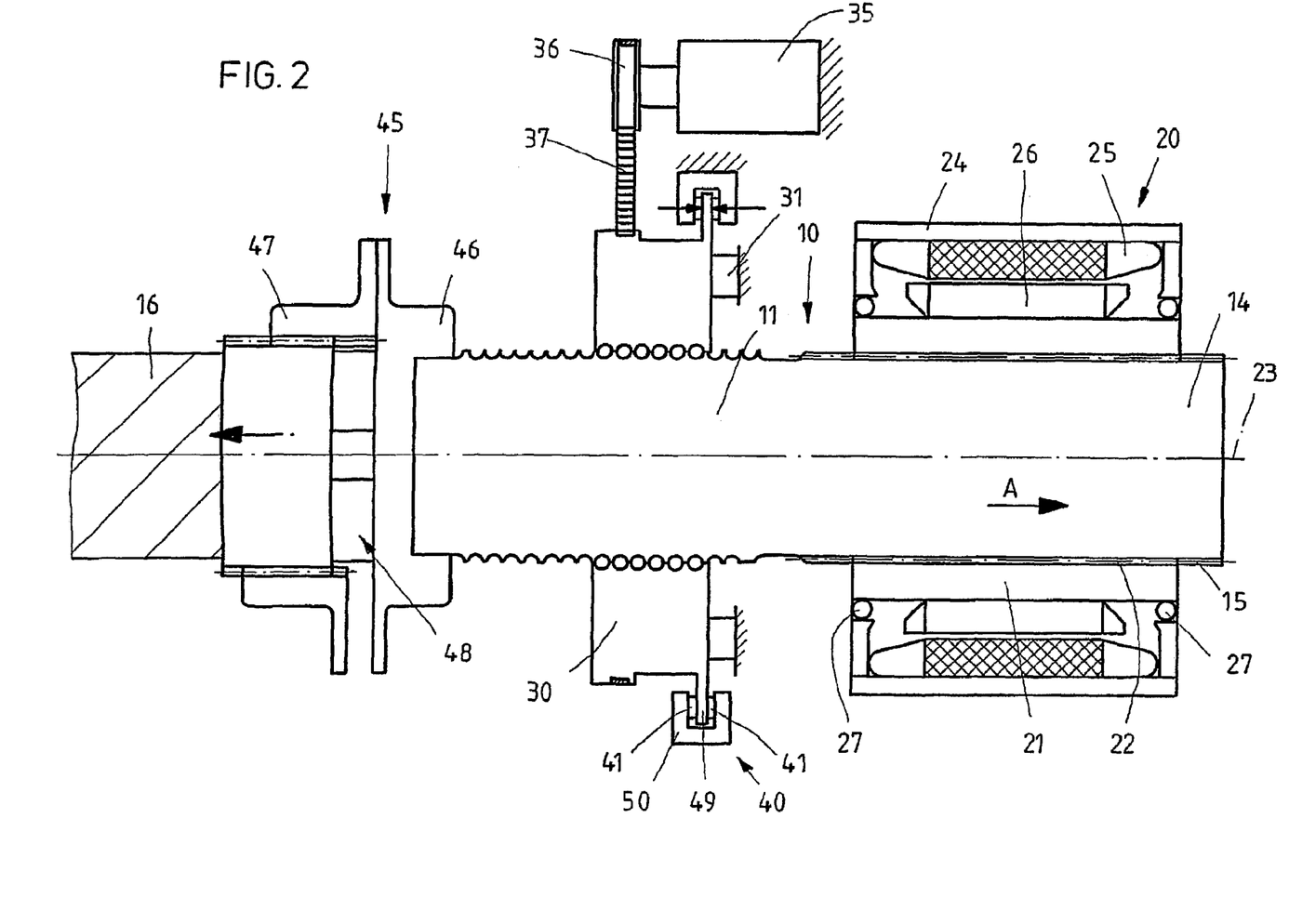
FIG. 2 shows a second exemplary embodiment, which is constructed like that from FIG. 1 with regard to the two electric motors, the motion spindle and the spindle nut, but in which an externally operated clutch is located between motion spindle and screw.

In its basic construction with regard to the motion spindle 10, the spindle nut 30 and the two electric motors 20 and 35, the embodiment according to FIG. 2 corresponds to the embodiment according to FIG. 1, so that this need not be dealt with again. Only two developments of the embodiment according to FIG. 1 shall be considered in more detail.

Firstly, the motion spindle 10 and the screw 16 are not firmly connected to one another in the direction of rotation.

Rather, an externally operated clutch 45 having a clutch disk 46 which is fixed relative to the motion spindle 10 and an axially movable clutch disk 47 guided on the screw 16 is arranged between them. In addition, the screw and the motion spindle are axially supported against one another via a rolling-contact bearing 48. In FIG. 2, the clutch 45 is depicted in its closed state above the axis 23 and in its open state below the axis 23.

Unlike the embodiment according to FIG. 1, a brake disk 49 of a brake 40 is integrally formed on the spindle nut 30 on the one side of the belt 37. This brake disk 49 engages in a brake ring 50 which is provided with the revolving inner grove and on which axially movable brake shoes 41 which can be pressed against the brake disk 49 are held on both sides of the latter. The advantage of the brake arrangement according to FIG. 2 compared with that according to FIG. 1 consists in the fact that the toothed belt 37 can be exchanged without being impaired by the brake.

In the embodiment according to FIG. 2, in order to plasticize plastic, the motion spindle 10 is driven at a certain rotational speed by the first electric motor 20. The clutch 45 is actuated, so that the screw 16 rotates at the same time and at the same rotational speed. The electric motor 35 drives the spindle nut 30 at a slightly higher rotational speed, so that the screw travels back with the motion spindle 10 in the direction of the arrow A under the effect of the dynamic pressure. For the injection, the spindle nut 30 is locked by the brake 40. In addition, the clutch 45 is released. The electric motor 20 continues to drive the motion spindle in the same direction of rotation, so that the motion spindle 10 and the screw 16 travel forward against the direction of the arrow A and plastic is injected. The screw 16 does not rotate in the process.

Figure 3:
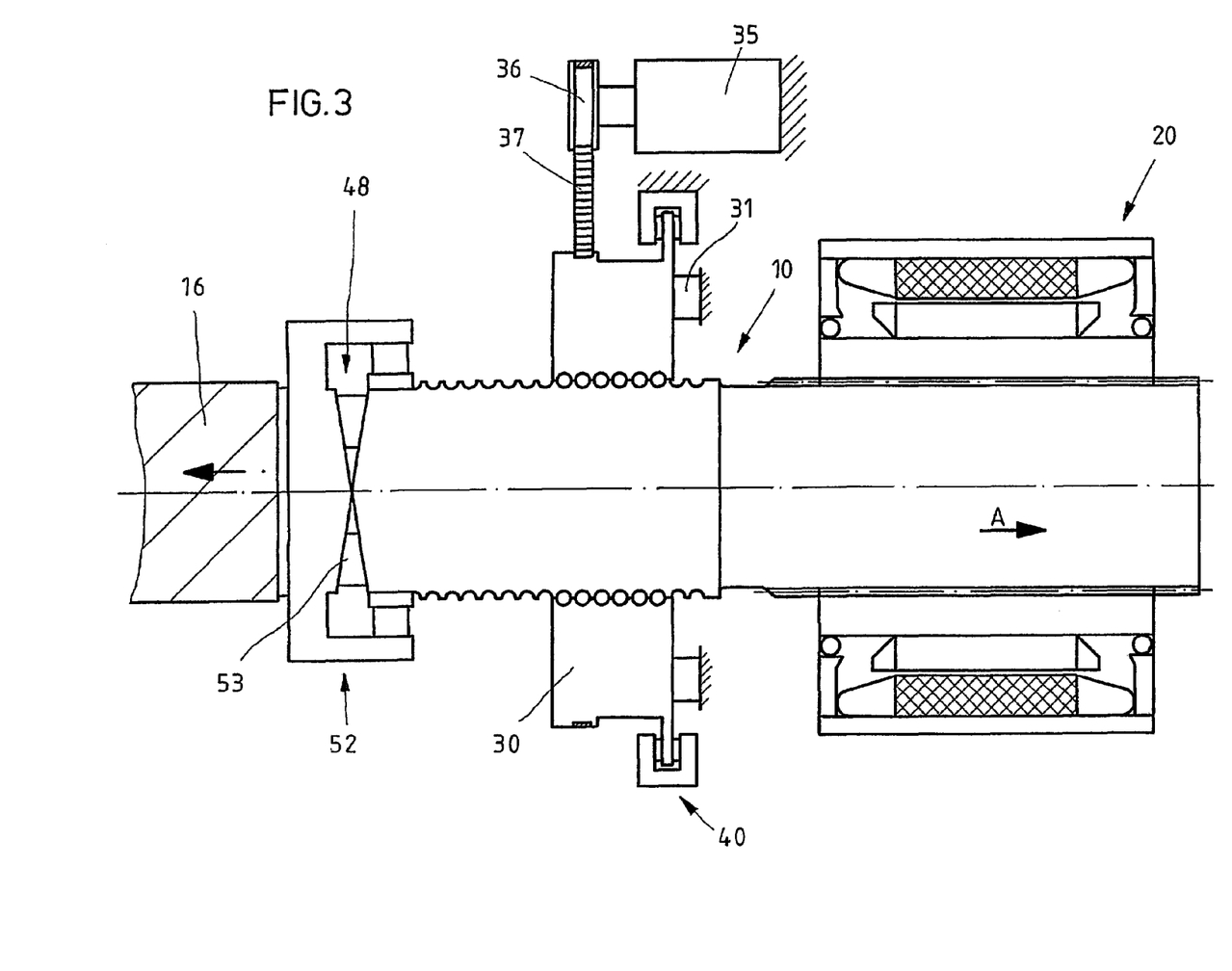
FIG. 3 shows a third exemplary embodiment, which differs from that according to FIG. 2 merely in that the clutch is a one-way clutch.

The embodiment according to FIG. 3 differs from that according to FIG. 2 from the constructional point of view only in the region of the coupling between the motion spindle 10 and the screw 16. Between these two parts there is now a one-way clutch, a "freewheel" 52, from which the rotation of the motion spindle is transmitted in the direction of the screw 10, whereas the screw 16 remains at rest during a rotation of the motion spindle 10 in the opposite direction. Unlike the embodiment according to FIG. 2, the thrust bearing 48 between the screw 16 and the motion spindle 10 does not contain any barrel rollers, but rather contains cones 53 as rolling-contact bodies, which are located in a clearance space, widening conically outward, between motion spindle 10 and screw 16. As a result, a neat rolling movement of the rolling-contact bodies is possible.

The other type of clutch between the motion spindle 10 and the screw 16 is combined with another type of control of the two electric motors 20 and 35. Assuming that the threads on the motion spindle 10 and spindle nut 30 are right-hand threads, the electric motor 20 rotates the motion spindle 10 counterclockwise at the desired rotational speed for plasticizing the plastic. Via the freewheel 52 effective in this direction, the motion spindle 10 rotates the screw 16 along with it. The spindle nut 30 is driven by the electric motor 35 at a rotational speed which is slightly lower than the rotational speed of the motion spindle 10. Accordingly, the screw 16 and motion spindle 10 travel slowly back in the direction of the arrow A. For the injection, the spindle nut 30 is locked by the brake 40. The electric motor 20 now rotates in the opposite direction, in which the motion spindle 10 travels forward against the direction of the arrow A and carries the screw 16 along with it without the latter performing a rotation.

Figure 4:
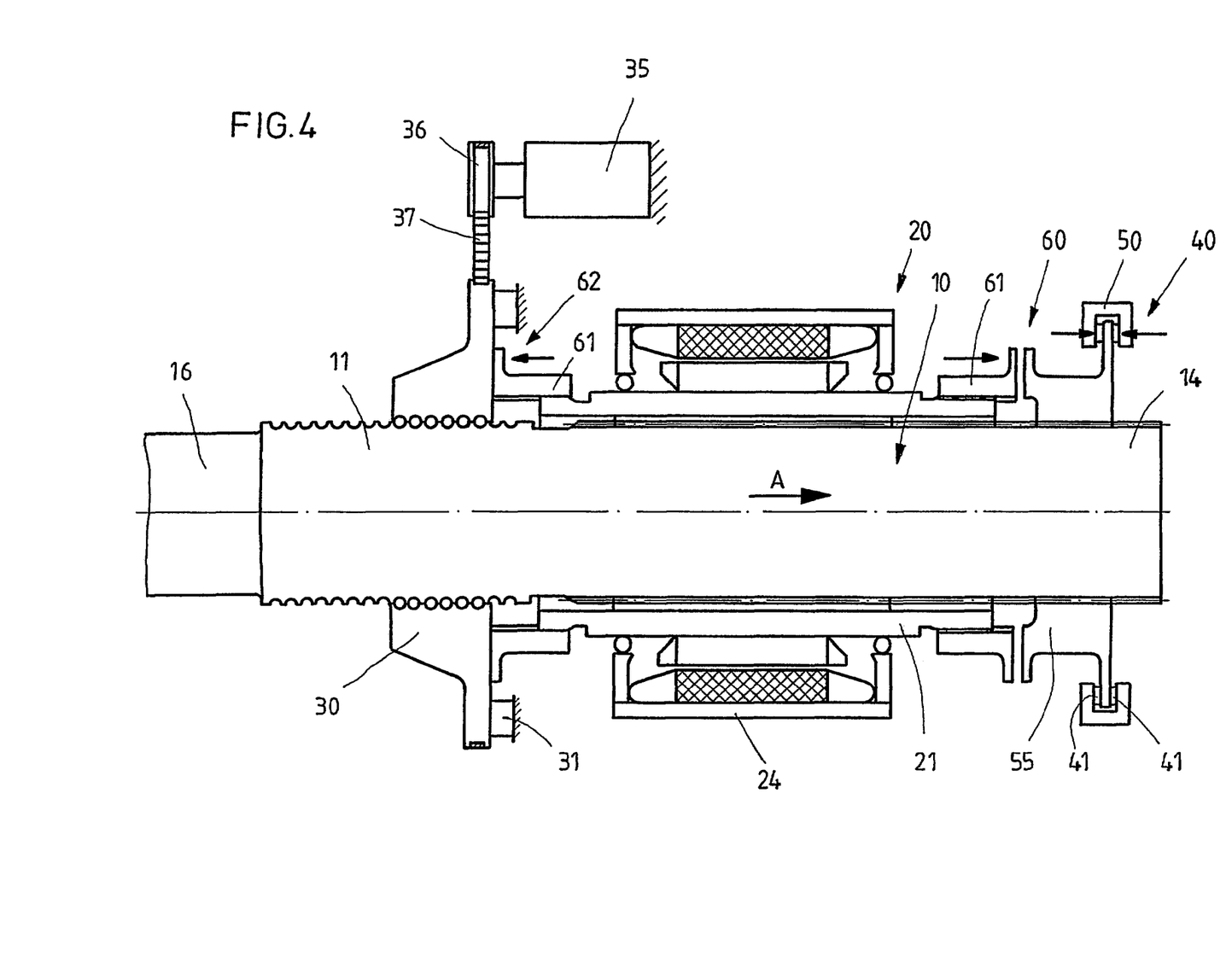
FIG. 4 shows a fourth exemplary embodiment, in which the large electric motor can be coupled to the motion spindle via a first clutch and to the spindle nut via a second clutch, and the brake acts on the motion spindle.

In the embodiment according to FIG. 4, the motion spindle 10 having a threaded section 11 and a spline section 14 is firmly connected to a screw 16 as in the embodiment according to FIG. 1. A spindle nut 30 is guided on the threaded section 11 of the motion spindle 10 and is axially supported via the thrust bearing 31. The spindle nut can be rotationally driven by the electric motor 35 via an output belt pulley 36 and a belt 37. The first electric motor 20 of the embodiment according to FIG. 4, as in the embodiments according to FIGS. 1 to 3, is arranged in the region of the splined shaft 14 of the motion spindle 10. Compared with the electric motor 20 from FIGS. 2 and 3, it is modified inasmuch as the hollow shaft 21 now projects on both sides beyond the housing 24. Guided in a rotationally locked but axially displaceable manner on the splined shaft 14 in front of that end of the hollow shaft 21 which is remote from the spindle nut 30 is a disk 55 which assumes a fixed position relative to the frame in the axial direction and has the function of a clutch disk and a brake disk. It is a clutch disk inasmuch as it can be driven via a first externally operated clutch 60 by the electric motor 20 via the hollow shaft 21, the motion spindle 10 being carried along in a rotational manner when the clutch is closed. The clutch 60 also includes a clutch disk 61 which is coupled to the hollow shaft 21 via a sliding pair and can be moved axially relative to the hollow shaft 21 and the disk 55. The actuation may be effected, for example, in interaction between a pneumatic actuating element and a restoring spring. The disk 55 is a brake disk inasmuch as a brake ring 50 and brake shoes 41 of a brake 40 are assigned to the disk 55. The disk 55 can be locked against rotation by the brake 40, as a result of which the motion spindle is also locked against rotation.

The hollow shaft 21 can also be coupled to the spindle nut 33 by a second externally actuated clutch 62. In the same way as the clutch 60, the clutch 62 also has an axially guided clutch disk 61 on the hollow shaft 21, and this clutch disk 61 can be pressed against the spindle nut 30.

In order to plasticize plastic, the clutch 60 is closed, so that the screw spindle 10 is driven in the direction of rotation, for example counterclockwise, by the electric motor 20. The electric motor 35 drives the spindle nut 30 at a slightly lower rotational speed likewise in the counterclockwise direction of rotation, it being assumed that the threads on motion spindle and spindle nut are right-hand threads. The spindle 10 then travels slowly back in the direction of the arrow A. For the injection, the clutch 60 is opened and the clutch 62 closed. In addition, the disk 55 and thus the motion spindle 10 and the screw 16 are locked against rotation by the brake 40. The electric motor 20 maintains its direction of rotation and now drives the spindle nut 30 in the counterclockwise direction of rotation. As a result, the screw 16 and motion spindle 10 travel forward against the direction of the arrow A.

It is also possible for the electric motor 20, during the plasticization, to rotate the motion spindle clockwise against the direction of rotation during the injection. The rotational speed of the spindle nut 30, during the plasticization, must then be slightly higher than the rotational speed of the motion spindle 10. Different directions of rotation of the electric motor 20 during the plasticization and during the injection offer the possibility of using freewheels instead of externally actuated clutches 60 and 62, of which freewheels the one, in the one direction of rotation of the electric motor 20, couples its hollow shaft 21 to the motion spindle 10 via the disk 55, and the other couples the hollow shaft 21 to the motion spindle 10 in the other direction of rotation via the spindle nut 30.

Figure 5:
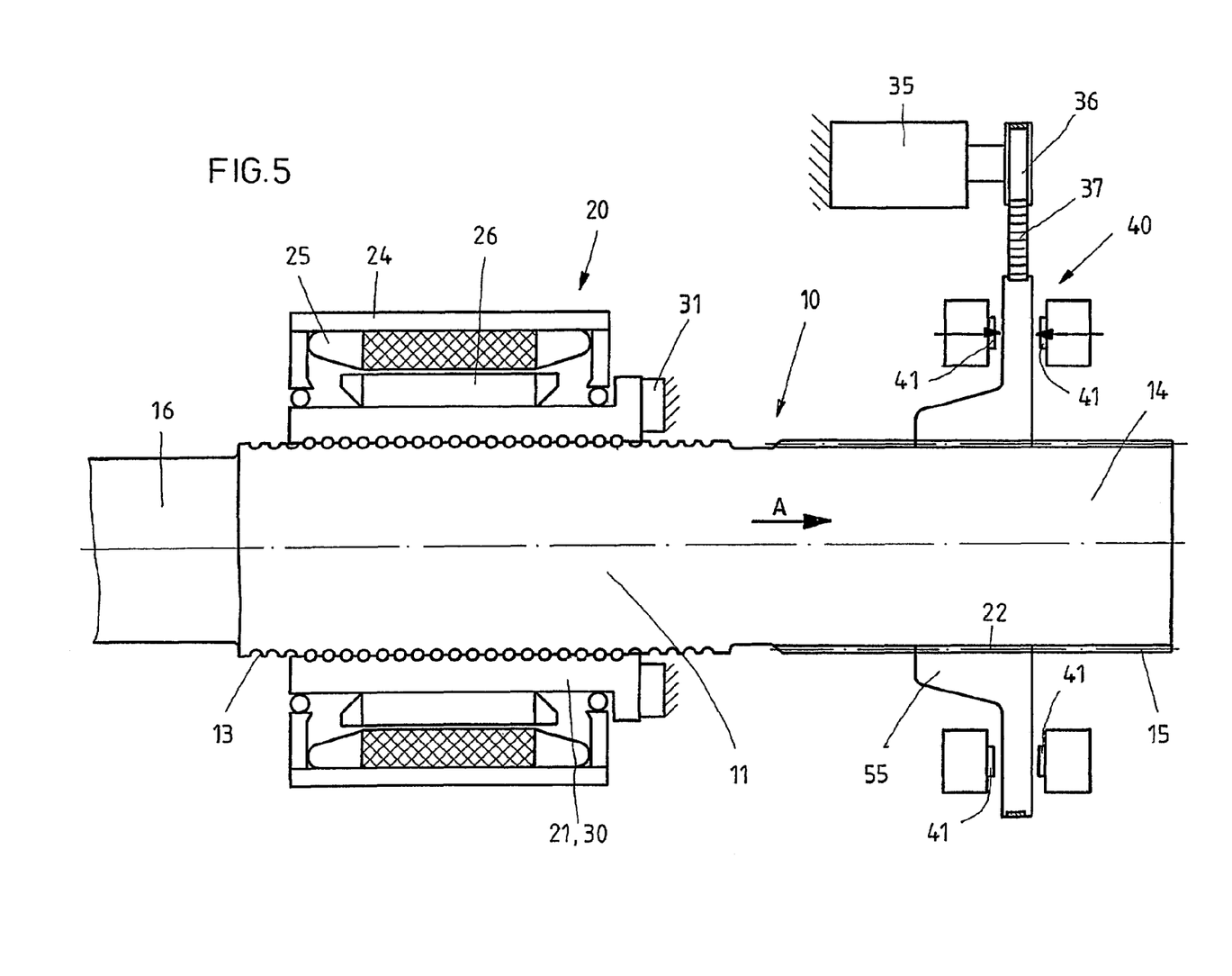
FIG. 5 shows a fifth exemplary embodiment in which the large, first electric motor rotationally drives the spindle nut and the second electric motor rotationally drives the motion spindle, and the brake acts on the motion spindle.

The screw is also firmly connected to the motion spindle 10 in the embodiment according to FIG. 5. The motion spindle 10 again has a threaded section 11 having a thread and a section 14 with keyways 15. Guided on the threaded section 11 is a spindle nut 30 which is supported via the thrust bearing 31 and which, unlike the embodiments according to FIGS. 1 to 4, is now at the same time the hollow shaft 21 of the first electric motor 20. With regard to the housing 24, the windings 25 and the rotor 26, this electric motor is formed in exactly the same way as in the embodiments according to FIGS. 2 to 4. As in the embodiment according to FIG. 4, a drive disk 55 is guided in the region of the splined shaft 14 on the motion spindle 10, this drive disk 55 assuming a position fixed relative to the frame in the axial direction and engaging with splines 22 in the keyways 15 of the splined shaft 14. As a result, a sliding pair is formed between the motion spindle 10 and the drive disk 55, this sliding pair permitting an axial displacement of the motion spindle 10 relative to the disk 55 but firmly connecting the two elements to one another in the direction of rotation. The disk 55 can be rotationally driven by the electric motor 35 via its output pinion 36 and a toothed belt 37. In addition to the drive disk, the disk 55 also forms a brake disk for a brake 40, the brake shoes 41 of which, as in the embodiment according to FIG. 1, are arranged on both sides of the plane in which the belt 37 moves.

In the embodiment according to FIG. 5, in order to plasticize plastic, the motion spindle 10 and with it the screw 16 are driven by the electric motor 35 at the requisite rotational speed. The electric motor 20 drives the spindle nut 30 at a rotational speed which differs slightly from the rotational speed of the motion spindle 10, so that the screw 16 and the motion spindle 10 travel back slowly in the direction of the arrow A during the plasticization. Since the torque required for the plasticization is relatively small, a small electric motor 35 is still sufficient. To inject plastic into the mold, the disk 55 is locked by the brake 40, so that the motion spindle 10 and the screw 16 can no longer rotate. The electric motor 20 now drives the spindle nut 30 in such a direction of rotation that the screw 16 and motion spindle 10 are displaced forward against the direction of the arrow A.

Figure 6:
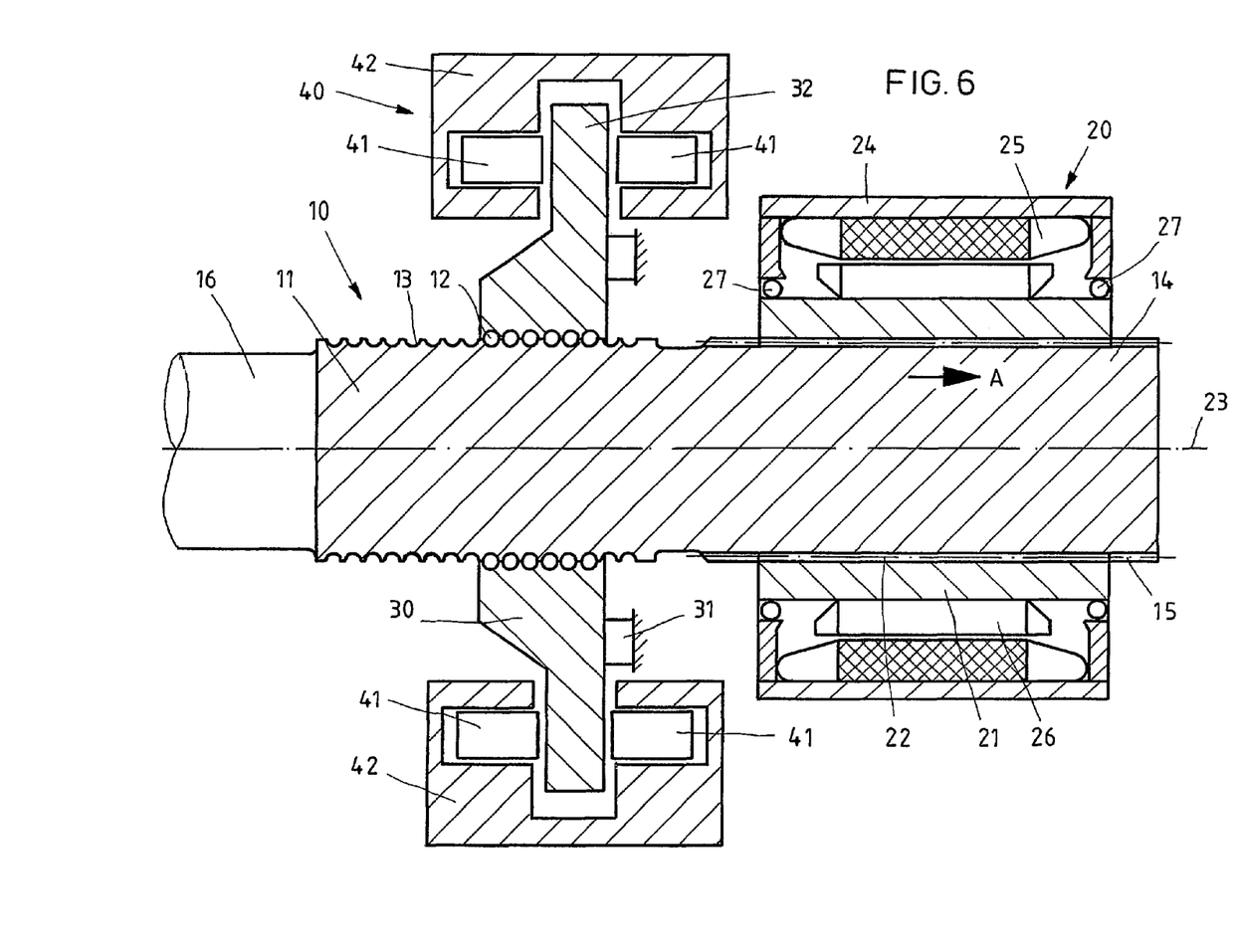
FIG. 6 shows a sixth exemplary embodiment, in which, as in the first exemplary embodiment, a large electric motor is directly coupled to the motion spindle via a sliding pair, and the spindle nut can be braked to a desired rotational speed by the brake for producing a dynamic pressure and can also be locked by the brake for the injection.

In the exemplary embodiment according to FIG. 6, compared with the first exemplary embodiment, the second electric motor and the drive means between this electric motor and the spindle nut are omitted. Otherwise, the sixth exemplary embodiment, from the constructional point of view, is identical to the first exemplary embodiment. Accordingly, a motion spindle 10 of the injection unit, a detail of which is shown in FIG. 6, has a section 11 with an external thread 13 suitable for guiding balls 12 and a section 14 which is formed as a splined shaft and is provided with axially running keyways 15. At one end of the threaded section 11, the motion spindle is firmly connected to a screw 16. The motion spindle 10 can be rotationally driven by a large electric motor 20. The latter is formed as a hollow-shaft motor with a hollow shaft 21 which has splines 22 on the inside, these splines 22 engaging in the keyways 15 of the motion spindle 10. A sliding pair is formed between the electric motor 20 and the motion spindle 10 by the keyways 15 in the section 14 of the motion spindle 10 and by the splines 22 in the hollow shaft 21, this sliding pair permitting a rectilinear movement between the motion spindle 10 and the hollow shaft 21 in the direction of the axis 23 of the motion spindle. A housing 24 of the electric motor 20 accommodates a stator with windings 25 and is arranged so as to be fixed relative to the frame. The hollow shaft 21, which carries the rotor 26, is mounted in a rotatable manner in the housing 24 via two rolling-contact bearings 27 which can absorb both radial and axial forces. The electric motor 20, as already indicated above by the expression "large", is a relatively powerful motor which can apply high torques.

Guided on the threaded section 11 of the motion spindle 10 is a spindle nut 30 which is formed as a recirculating ball sleeve and is axially supported via a thrust bearing 31 on its side facing the electric motor 20. On the outside, the spindle nut 30 is provided with a disk-shaped flange 32. In contrast to the first exemplary embodiment, the flange does not have an external tooth system. The flange 32, as a type of brake disk, is also an integral part of a brake 40 which has a plurality of brake calipers 42 which overlap the flange and in which brake shoes 41 are located on both sides of the flange, these brake shoes 41 being movable perpendicularly to the plane of the brake disk 32 but being arranged fixed to the frame and parallel to this plane. With the brake 40, which can be actuated electromagnetically or hydraulically for example and with which braking forces of different magnitude can be exerted, the spindle nut 30 can be braked specifically to a desired and also variable rotational speed and can also be locked completely against rotation.

If, during operation, the motion spindle 10 is driven by the electric motor 20 in one direction of rotation, for example clockwise, the direction of the axial movement of the motion spindle 10 depends on the rotational speed of the spindle nut 30 relative to the rotational speed of the motion spindle 30. If the spindle nut 30 rotates clockwise quicker than the motion spindle 10, the latter travels to the rear in the direction of the arrow A. If the rotational speeds of spindle nut and motion spindle are identical, the motion spindle does not move in the axial direction. If the rotational speed of the spindle nut is less than the rotational speed of the motion spindle, the latter travels axially forward. During the plasticization, plastic material is delivered by the rotating screw in front of its one end. A dynamic pressure which attempts to displace the screw and the motion spindle rearward in the direction of the arrow A builds up there. A displacement to the rear is only possible if the spindle nut 30 rotates clockwise quicker than the motion spindle. If the brake 40 is released, the minimum possible dynamic pressure is obtained. The latter is determined by the friction moments in the screw joint between the motion spindle 10 and the spindle nut 30, in the thrust bearing 31 and in the released brake 40 and results from the force which is necessary in order to displace the motion spindle 10 in the direction of the arrow A when brake 40 is released and with the spindle nut 30 rotating. The friction moment acting on the spindle nut can now be increased by exerting defined braking forces, so that the force required for displacing the motion spindle and thus the dynamic pressure increase. If the spindle nut is braked to the rotational speed of the motion spindle, the motion spindle comes to a stop axially and the dynamic pressure increases sharply. By braking the rotational speed of the spindle nut to below the rotational speed of the motion spindle, the axial direction of movement of the motion spindle can even be reversed and an even sharper increase in the dynamic pressure can be obtained. In this way, a certain dynamic pressure profile can be covered during the plasticization by varying the braking moment. The axial force exerted on the spindle nut 30 in the process is absorbed by the bearing 31. It is also conceivable to actuate the brake directly as a function of a measured value of the dynamic pressure.

If sufficient plastic is plasticized, the spindle nut 30 is locked against further rotation by the brake 40. The electric motor 20 continues to rotate the motion spindle 10 clockwise at a rotational speed required for the injection operation, so that, on account of the screw joint between the motion spindle 10 and the spindle nut 30, the motion spindle 10 and the screw 16 are displaced against the direction of the arrow A and plastic is injected into the mold.

The invention claimed is:

1. An injection unit for a plastic injection molding machine, comprising:
   a screw (16),
   a motion spindle (10) as a first drive element, via which the screw (16) can be rotationally driven for the plasticization and is movable in the axial direction for the injection,
   a spindle nut (30) as second drive element, which is coupled to the motion spindle (10) via a motion screw thread (13),
   a large electric motor (20) which is arranged so as to be fixed to the frame and by which, while one drive element (10, 30) is held against rotation, the other drive element (30, 10) can be rotationally driven for moving the screw (16) during the injection, and
   a device (35, 40) which is arranged so as to be fixed to the frame and by which a rotational speed of the one drive element (10, 30) can be preset during the plasticization, said rotational speed being different from rotational speed at which the large electric motor (20) simultaneously drives the other drive element (30 10), wherein
   the drive element (10, 30) held against rotation during the moving of the screw (16) for the injection is lockable by a releasable mechanical brake (40), and
   wherein a first clutch (60) which is effective for rotating the screw (16) during the plasticization is arranged between the motion spindle (10) and the large electric motor (20), and a second clutch (62) which is effective for moving the screw (16) during the injection is arranged between the spindle nut (30) and the large electric motor (20).

2. The injection unit as claim 1, wherein the braking force of the brake (40) is variable, and the brake forms the device, and the rotational speed of the spindle nut (30) is presetable by the latter during the plasticization.

3. The injection unit as claimed in claim 1, wherein the device is a second electric motor (35), by which the one drive element (10, 30), during the plasticization, is drivable at a rotational speed which is different from the rotational speed at which the large electric motor (20) simultaneously drives the other drive element (30, 10).

4. The injection unit as claimed in claim 1, wherein the large electric motor (20) is arranged with its axis in alignment with the axis (23) of the motion spindle (10) and is formed as an electric motor having a hollow shaft (21).

5. The injection unit as claimed in claim 3, wherein the second electric motor (35) is arranged with its axis outside an axis of the motion spindle (10) and is connected to the one drive element (10, 30) via driving means (36, 37).

6. The injection unit as claimed in claim 5, wherein the driving means (36, 37) are part of a speed reducer.

7. The injection unit as claimed in claim 5, wherein the second electric motor (35) has an output pinion (36) which is coupled to the one drive element (10, 30) via a belt drive (37).

8. The injection unit as claimed in claim 7, wherein the belt drive has a V-belt or toothed belt (37).

9. The injection unit as claimed in claim 1, wherein the rotational speed of the spindle nut (30) is presetable by the device (35, 40).

10. The injection unit as claimed in claim 9, wherein the large electric motor (20) is connected to the motion spindle (10) via a sliding pair (15, 22), the spindle nut (30) is lockable against rotation by the brake (40), and the large electric motor (20) drives the motion spindle (10) for the plasticization when the brake (40) is released and when the spindle nut (30) is driven by the second electric motor (35) and for injection of plastic when the spindle nut (30) is locked by the brake (40).

11. The injection unit as claimed in claim 10, wherein a rotational movement of the motion spindle (10) is transmitable to the screw (16) via a clutch (45, 52).

12. The injection unit as claimed in claim 1, wherein the spindle nut (30) is rotationally drivable by the large electric motor (20), by which the screw (16) is movable during the injection, and the motion spindle (10) is lockable against rotation by the brake (40).

13. An injection unit for a plastic injection molding machine, comprising:
    a screw (16),
    a motion spindle (10) as a first drive element, via which the screw (16) can be rotationally driven for the plasticization and is movable in the axial direction for the injection,
    a spindle nut (30) as second drive element, which is coupled to the motion spindle (10) via a motion screw thread (13),
    a large electric motor (20) which is arranged so as to be fixed to the frame and by which, while one drive element (10, 30) is held against rotation, the other drive element (30, 10) can be rotationally driven for moving the screw (16) during the injection, and
    a device (35, 40) which is arranged so as to be fixed to the frame and by which a rotational speed of the one drive element (10, 30) can be preset during the plasticization, said rotational speed being different from rotational speed at which the large electric motor (20) simultaneously drives the other drive element (30, 10), wherein
    the drive element (10, 30) held against rotation during the moving of the screw (16) for the injection is lockable by a releasable mechanical brake (40);
    wherein the spindle nut (30) is rotationally drivable by the large electric motor (20), by which the screw (16) is movable during the injection, and the motion spindle (10) is lockable against rotation by the brake (40); and
    wherein a first clutch (60) which is effective for rotating the screw (16) during the plasticization is arranged between the motion spindle (10) and the large electric motor (20), and a second clutch (62) which is effective for moving the screw (16) during the injection is arranged between the spindle nut (30) and the large electric motor (20).

14. The injection unit as claimed in claim 13, wherein the motion spindle (10) is coupled via a sliding pair to a third drive element (55) which at the same time lies in the kinematic chain between the motion spindle (10) and the large electric motor (20) and in the kinematic chain between the motion spindle (10) and the brake (40).

15. An injection unit for a plastic injection molding machine, comprising:
    a screw (16),
    a motion spindle (10) as a first drive element, via which the screw (16) can be rotationally driven for the plasticization and is movable in the axial direction for the injection, a spindle nut (30) as second drive element, which is coupled to the motion spindle (10) via a motion screw thread (13), a large electric motor (20) which is arranged so as to be fixed to the frame and by which, while one drive element (10, 30) is held against rotation, the other drive element (30, 10) can be rotationally driven for moving the screw (16) during the injection, and a device (35, 40) which is arranged so as to be fixed to the frame and by which a rotational speed of the one drive element (10, 30) can be preset during the plasticization, said rotational speed being different from rotational speed at which the large electric motor (20) simultaneously drives the other drive element (30, 10), wherein the drive element (10, 30) held against rotation during the moving of the screw (16) for the injection is lockable by a releasable mechanical brake (40);

wherein the spindle nut (30) is rotationally drivable by the large electric motor (20), by which the screw (16) is movable during the injection, and the motion spindle (10) is lockable against rotation by the brake (40), wherein the rotational speed of the spindle nut (30) is presetable by the device (35, 40), wherein the large electric motor (20) is connected to the motion spindle (10) via a sliding pair (15, 22), the spindle nut (30) is lockable against rotation by the brake (40), and the large electric motor (20) drives the motion spindle (10) for the plasticization when the brake (40) is released and when the spindle nut (30) is driven by the second electric motor (35) and for injection of plastic when the spindle nut (30) is locked by the brake (40), wherein a rotational movement of the motion spindle (10) is transmitable to the screw (16) via a clutch (45, 52), and wherein one clutch (48, 60, 62) is an externally operated clutch which is operated between the plasticization and the injection.

16. An injection unit for a plastic injection molding machine, comprising:

a screw (16), a motion spindle (10) as a first drive element, via which the screw (16) can be rotationally driven for the plasticization and is movable in the axial direction for the injection, a spindle nut (30) as second drive element, which is coupled to the motion spindle (10) via a motion screw thread (13), a large electric motor (20) which is arranged so as to be fixed to the frame and by which, while one drive element (10, 30) is held against rotation, the other drive element (30, 10) can be rotationally driven for moving the screw (16) during the injection, and a device (35, 40) which is arranged so as to be fixed to the frame and by which a rotational speed of the one drive element (10, 30) can be preset during the plasticization, said rotational speed being different from rotational speed at which the large electric motor (20) simultaneously drives the other drive element (30, 10), wherein the drive element (10, 30) held against rotation during the moving of the screw (16) for the injection is lockable by a releasable mechanical brake (40);

wherein the spindle nut (30) is rotationally drivable by the large electric motor (20), by which the screw (16) is movable during the injection, and the motion spindle (10) is lockable against rotation by the brake (40), wherein the rotational speed of the spindle nut (30) is presetable by the device (35, 40), wherein the large electric motor (20) is connected to the motion spindle (10) via a sliding pair (15, 22), the spindle nut (30) is lockable against rotation by the brake (40), and the large electric motor (20) drives the motion spindle (10) for the plasticization when the brake (40) is released and when the spindle nut (30) is driven by the second electric motor (35) and for injection of plastic when the spindle nut (30) is locked by the brake (40), wherein a rotational movement of the motion spindle (10) is transmitable to the screw (16) via a clutch (45, 52), and wherein one clutch (52) is a one-way clutch, and by the large electric motor (20), one drive element (10) is drivable in one direction of rotation for the plasticization and in the other direction of rotation for the injection.

17. An injection unit for a plastic injection molding machine, comprising:

a screw (16), a motion spindle (10) as a first drive element, via which the screw (16) can be rotationally driven for the plasticization and is movable in the axial direction for the injection, a spindle nut (30) as second drive element, which is coupled to the motion spindle (10) via a motion screw thread (13), a large motor (20) which is arranged so as to be fixed to the frame and by which, while one drive element (10, 30) is held against rotation, the other drive element (30, 10) can be rotationally driven for moving the screw (16) during the injection, and a device (35, 40) which is arranged so as to be fixed to the frame and by which a rotational speed of the one drive element (10, 30) can be preset during the plasticization, said rotational speed being different from rotational speed at which the large electric motor (20) simultaneously drives the other drive element (30, 10), wherein the drive element (10, 30) held against rotation during the moving of the screw (16) for the injection is lockable by a releasable mechanical brake (40);

wherein the spindle nut (30) is rotationally drivable by the large electric motor (20), by which the screw (16) is movable during the injection, and the motion spindle (10) is lockable against rotation by the brake (40); and wherein the second electric motor (35) is connected to the motion spindle (10) via a sliding pair, a drive element (55) in kinematic chain between the second electric motor (35) and the sliding pair is lockable against rotation by the brake (40), and for the plasticization, the second electric motor (35) drives the motion spindle (10) when the brake (40) is released and when the spindle nut (30) is driven by the first electric motor (20), and, for the injection of plastic, the first electric motor (20) drives the spindle nut (30) when the motion spindle (10) is locked against rotation by the brake (40).

18. The injection unit as claimed in claim 13, wherein one clutch (48, 60, 62) is an externally operated clutch which is operated between the plasticization and the injection.

19. The injection unit as claimed in claim 13, wherein one clutch (52) is a one-way clutch, and by the large electric motor (20), one drive element (10) is drivable in one direction of rotation for the plasticization and in the other direction of rotation for the injection.

20. An injection unit for a plastic injection molding machine, comprising:
- a screw (16), and a motion spindle (10) connectable directly to the screw and being coaxial with the screw, the motion spindle (10) serving as a first drive element to rotate the screw for the plasticization and being movable in the axial direction for the injection,
- a spindle nut (30) as second drive element, which is coupled to the motion spindle (10) via a motion screw thread (13),
- a large electric motor (20), which is arranged so as to be fixed to a frame of the machine and by which, while one of the drive elements (10, 30) is held against rotation, the other drive element (30, 10) can be rotationally driven for moving the screw (16) during the injection, and
- a device (35, 40) which is arranged so as to be fixed to the frame and by which a rotational speed of the one drive element (10, 30) can be preset during the plasticization, said rotational speed being different from a rotational speed at which the large electric motor (20) simultaneously drives the other drive element (30, 10), wherein the drive element (10, 30) held against rotation during the moving of the screw (16) for the injection is lockable by a releasable mechanical brake (40), and wherein a first clutch (60) which is effective for rotating the screw (16) during the plasticization is arranged between the motion spindle (10) and the large electric motor (20), and a second clutch (62) which is effective for moving the screw (16) during the injection is arranged between the spindle nut (30) and the large electric motor (20).

* * * * *